Aug. 23, 1927.
A. L. MITCHELL
TWO-WAY DRAIN VALVE
Filed March 30, 1926
1,639,954
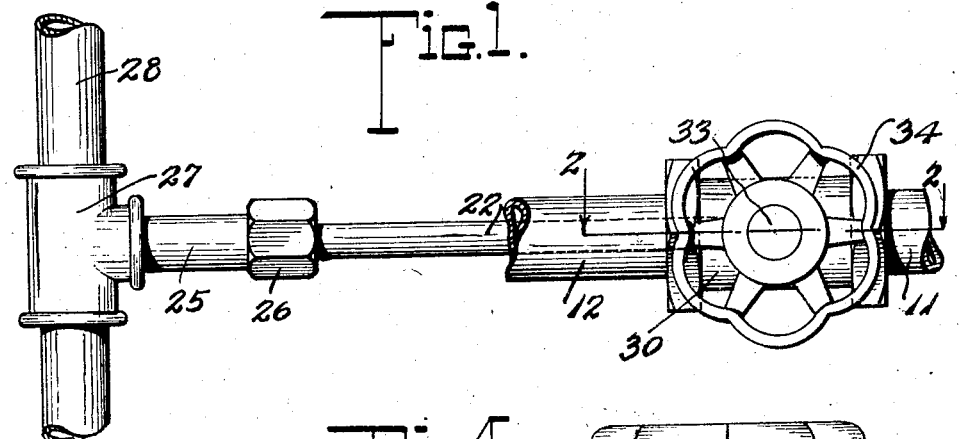
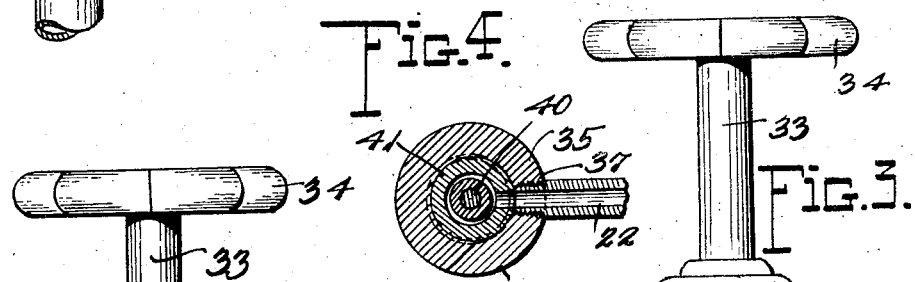
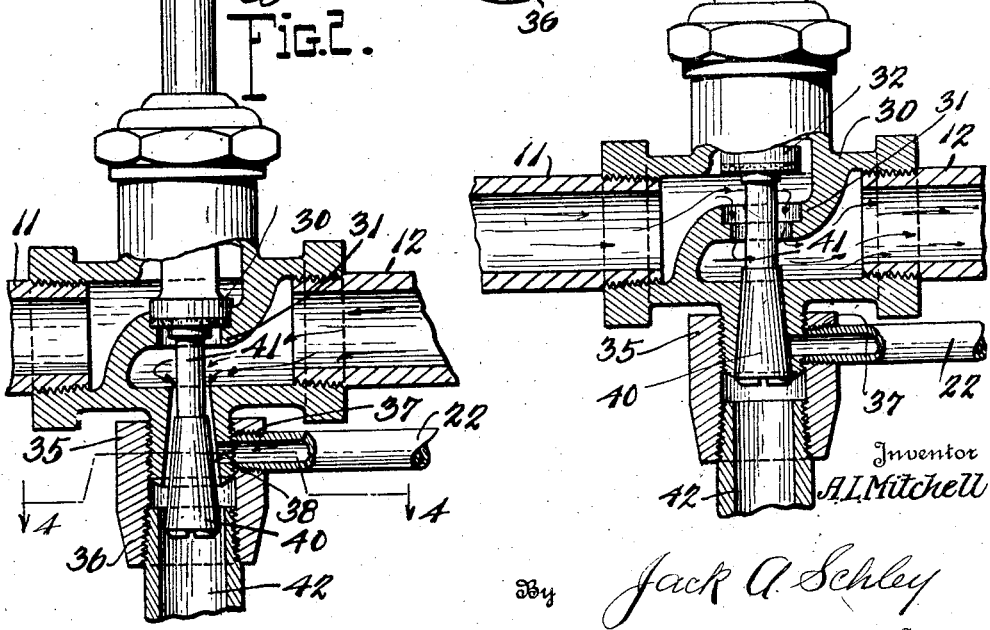

Patented Aug. 23, 1927.

1,639,954

UNITED STATES PATENT OFFICE.

ARTHUR L. MITCHELL, OF DALLAS, TEXAS.

TWO-WAY DRAIN VALVE.

Application filed March 30, 1926. Serial No. 98,466.

This invention relates to new and useful improvements in two-way drain valves.

The object of the invention is to provide a valve adapted to be connected in the main service line supplying both the cold and hot water pipes of the building and to connect said valve with the lowest point of the hot water pipes by a drain pipe and to provide said valve with means for connecting the drain pipe and the service pipe of the building, with a drain opening when said valve is closed, whereby both the cold water and the hot water pipes are drained by a single operation.

A construction designed to carry out the invention will be hereinafter described together with other features of the invention.

The invention will be more readily understood from a reading of the following specification and by reference to the accompanying drawings, in which an example of the invention is shown and wherein:

Fig. 1 is a plan view of a valve and connections made in accordance with my invention, Fig. 2 is a longitudinal section on line 2—2 of Fig. 1, with the valve closed for draining; Figure 3 is a similar view with the valve open and the drain closed; and Fig. 4 is a section on line 4—4 of Fig. 2.

In the drawing like numerals refer to similar parts in the several figures.

I have shown a valve of the globe type having a casing 30, having one end connected with a supply pipe 11 and the other end connected with a service pipe 12. A seat 31 is provided in the casing for a valve 32, operated by a stem 33 and hand wheel 34. Below the seat the casing has a depending nipple 35 externally screw threaded to receive a coupling nut 36. A hot water drain pipe 22′ is screwed into an aperture 37 in the nut so as to register with a drain port 38 in the nipple 35.

The nipple has a conical bore 39 forming a seat for a conical drain plug 40 suspended from the valve 32 by a shank 41. A drain pipe 42 may be screwed into the bottom of the nut 36. It will be seen that when the valve 32 is opened the shank 41 and plug 40 are raised, so that the latter seats in the bore 39, thus closing the latter and the drain pipe 22. The pipe 22 is connected with a short pipe 25 by a coupling 26 and the pipe 25 is in turn screwed into a T 27 connected in the hot water pipe 28. These connections are, of course, subject to variation. When the valve 32 is closed to cut off the water the plug 40 is lowered so that water from the pipe 12′ may drain under the seat 31 and out through the nipple; while the hot water is drained from the pipe 22′ through the port 38.

With this device a single operation of the valve will cut off the water supply and drain both the hot and cold water pipes; thus obviating the separate hot water pipe drain valve which is usually installed and frequently forgotten and left closed so that the pipes freeze in cold weather.

Various changes in the size and shape of the different parts, as well as modifications and alterations, may be made within the scope of the appended claims.

What I claim, is:

1. In a combined hot and cold water drain valve, a valve casing having supply and service pipe connections and an intermediate drain opening, a hot water drain pipe connected to the casing adjacent the drain opening, a main valve in the casing intermediate the supply and service connections, and a drain valve extended from the main valve and operating in the drain opening to close the same and the hot water drain pipe when the main valve is opened.

2. In a combined hot and cold water drain valve, a valve casing having supply and service pipe connections and an intermediate conical drain opening in alinement with a valve seat between said pipe connections, a hot water drain pipe connected to said drain opening, a main valve cooperating with said seat, and a stem extended therefrom and provided with a conical plug disposed in the drain opening to control the discharge therefrom and also the hot water drain pipe connection therewith.

In testimony whereof I affix my signature.

ARTHUR L. MITCHELL.